Nov. 6, 1962 P. W. MILLER 3,062,200
CHARCOAL CONDITIONER
Filed April 6, 1959
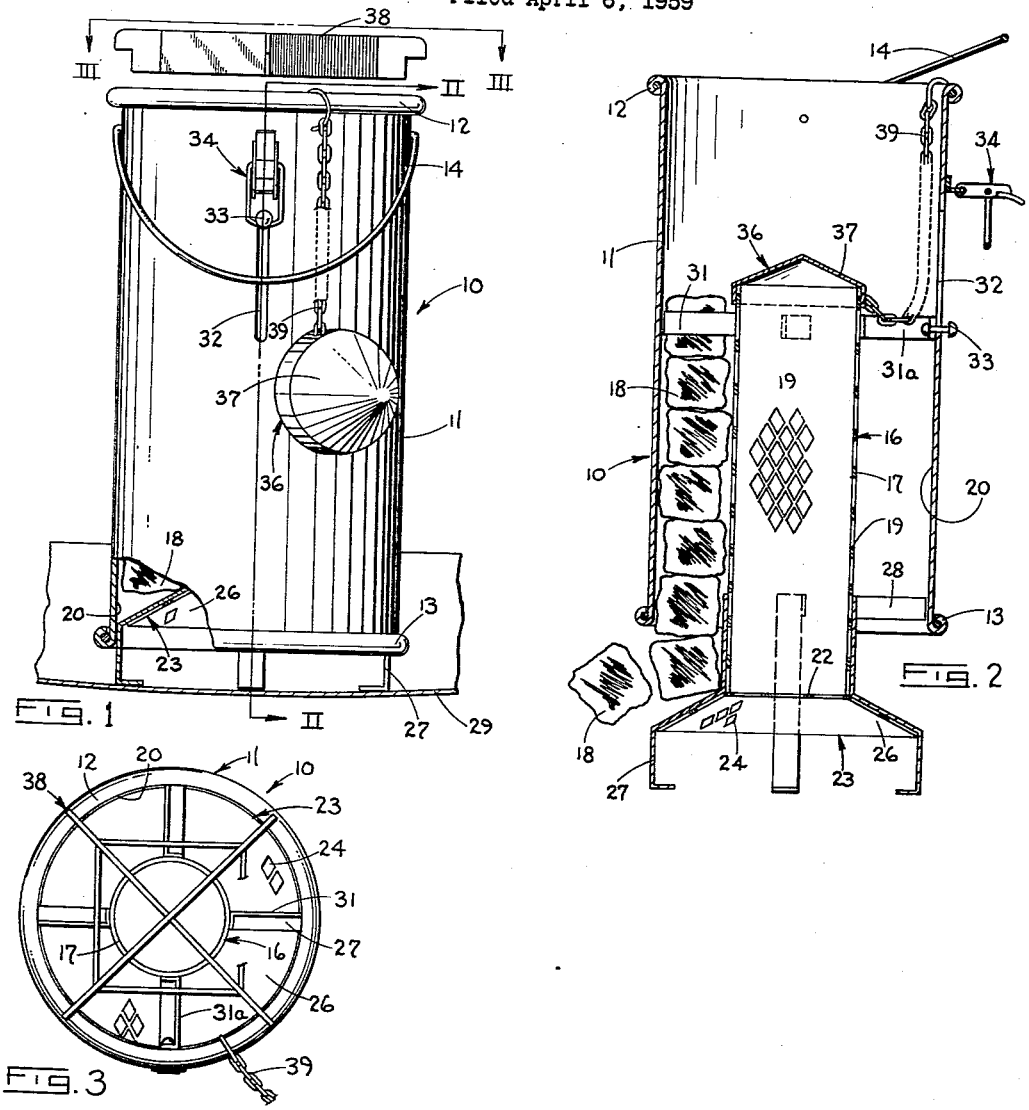
INVENTOR.
PAUL W. MILLER
BY
Woodhams Blanchard & Flynn
ATTORNEYS United States Patent Office 3,062,200
Patented Nov. 6, 1962

3,062,200
CHARCOAL CONDITIONER
Paul W. Miller, 837 W. South St., Kalamazoo, Mich.
Filed Apr. 6, 1959, Ser. No. 804,222
3 Claims. (Cl. 126—25)

This invention relates in general to an apparatus for conditioning charcoal for cooking purposes and, more particularly, to a type of apparatus wherein a supply of charcoal can be stored, quickly and properly ignited, and then quickly and easily transferred into a charcoal receiving device, such as a grill, for immediate use.

Persons acquainted with the use of charcoal as a fuel, particularly in some phase of cooking, are well aware of the problems which are encountered in preparing the charcoal for such use. For example, charcoal is dirty to handle, it is usually difficult to ignite and, in most instances, it must be carefully tended during the considerable period of time which is presently required to ignite the charcoal and prepare a bed of burning charcoal suitable for cooking. Moreover, the preparation of the ignited charcoal bed must, according to present practices, be performed in the fire pit, such as a pan-type grill, over which the cooking will be performed. That is, the fire pit or grill must first be prepared or set up, after which the kindling and/or charcoal are arranged therein and ignited.

Because of the time required to properly prepare the charcoal for cooking purposes, its use is often commenced before the bed is in proper condition for such use, according to good cooking standards, and its use is often completed about the time that the bed reaches its best condition for cooking purposes. Moreover, where the charcoal is ignited by kindling, for example, which is placed in the pit or grill, the kindling can adversely affect the character of the charcoal fire, particularly in its initial stage. For example, the kindling tends to create flames which are not desirable in a charcoal fire and they tend to produce fumes and smoke which adversely flavor the food, such as meat, being cooked by the fire. The most desirable type of charcoal fire is one in which the entire fire bed contains nothing but charcoal.

In an effort to overcome a portion of these problems, it has become common practice to spray or even impregnate the charcoal with an easily ignited material, such as liquid fuel. However, this procedure is sometimes dangerous and, where the charcoal is treated in advance, creates a serious fire hazard. Also, certain types of ignition fluids tend to change the characteristics of the charcoal so that they do not produce the desired results when used in cooking. Moreover, the igniting fuel is often consumed before the charcoal is ignited so that the entire process must be repeated.

Accordingly, a primary object of this invention has been the provision of an apparatus for conditioning charcoal, and particularly charcoal briquets, for cooking use, as in a pan-type charcoal grill.

A further object of this invention has been the provision of an apparatus, as aforesaid, in which the charcoal and kindling can be loaded well in advance of their intended use, which can be easily transported to the place of use, and in which the charcoal can be easily and quickly ignited by the small amount of kindling contained in the apparatus.

A further object of this invention has been the provision of an apparatus, as aforesaid, which is especially designed to hold charcoal briquets so that at least one surface of each briquet is exposed to an intense and fast acting, igniting flame produced by the kindling, whereby each briquet will be ignited in a minimum of time and with a minimum of difficulty.

A further object of this invention has been the provision of an apparatus, as aforesaid, whereby the ignited charcoal can be quickly and easily transferred to a charcoal receiving pit or grill of any substantially conventional type without handling the charcoal, without materially disturbing its ignited condition and without introducing into the grill any igniting fuels, such as liquids, kindling or the like, which can adversely alter the character of the charcoal or the heat produced thereby.

A further object of this invention has been the provision of an apparatus, as aforesaid, which is easy to load with charcoal and kindling, which is convenient to transport, which is pleasing in appearance, which requires little or no maintenance, and which is easy to fabricate and operate.

Other objects and purposes of this invention will become apparent to persons familiar with this type of equipment upon reading the following specification and examining the accompanying drawings, in which:

FIGURE 1 is a broken, side elevational view of a charcoal conditioner embodying the invention.

FIGURE 2 is a sectional view substantially as taken along the line II—II in FIGURE 1, with the conditioner in position to discharge its load of charcoal.

FIGURE 3 is a broken, top plan view of said charcoal conditioner.

For convenience in description, the terms "upper," "lower" and derivatives thereof will have reference to the upper and lower ends of the charcoal conditioner as appearing in FIGURES 1 and 2, which illustrate its normal position of operation. The terms "inner," "outer" and derivatives thereof will have reference to the geometric center of said charcoal conditioner and parts thereof.

*General Description*

The objects and purposes of the invention, including those set forth above, have been met by providing a charcoal conditioning apparatus comprised of a substantially cylindrical, upright kindling container which is concentrically encircled by and spaced inwardly from an outer, substantially cylindrical casing. Guide means, which may be mounted upon the kindling container, support and guide the casing for limited axial movement with respect to said container. An annular flange is mounted upon and extends outwardly and downwardly from the lower end of the kindling container toward the lower end of the casing when said casing is in its lowered position with respect to the kindling container, as shown in FIGURE 1. When the casing in its raised position (FIGURE 2), it is spaced upwardly from said flange so that charcoal disposed between the kindling container and the casing can discharge downwardly and outwardly between the lower end of the casing and said flange. Legs are mounted upon the lower end of the kindling container for supporting both the kindling container and the casing.

The kindling container and the lower flange thereon are fabricated from perforate material, such as expanded metal, and fastening means is provided for securing the kindling container with respect to the casing when the casing is in its lowered position. Cap means is provided for covering the kindling container when the apparatus is being loaded with charcoal.

*Detailed Construction*

The charcoal conditioner 10 (FIGURES 1 and 2), which has been selected to illustrate a preferred embodiment of the invention has a preferably cylindrical outer casing or shell 11 which is fabricated from heat resistant material, such as sheet metal, and has rolled upper and lower rims 12 and 13. A bail 14 is mounted upon said casing 11 near the upper end thereof.

A cup shaped, substantially cylindrical kindling container 16 (FIGURE 2), which is preferably concentric with and spaced from the casing 11, has a cylindrical side wall 17 with perforations 19 therethrough. The casing and side wall 17 define an annular chamber 20 having a radial width which is preferably approximately equal to the size of an average charcoal briquet 18, for example, of the type which is commonly available for cooking purposes. Normally, these briquets are in the order of from one and one half inches to two inches square and about one inch thick. Specific reference is made herein to the use of charcoal briquets for illustrative purposes and because of their convenient and uniform size. However, it will be seen that charcoal in other solid forms, such as irregularly sized chunks, may be placed in the chamber 20 for igniting within the teachings of the application. When the charcoal briquets, for example, are loaded within the chamber 20, they are automatically stacked so that at least one surface of each is adjacent to the wall 17.

The bottom wall 22 of the container 16 is provided by a central portion of a circular member 23, which has perforations 24 and which may, like the side wall 17, be fabricated from an expanded, heat resistant metal. The outer, annular portion 26 of the member 23, which extends outwardly from the side wall 17, preferably slopes downwardly. The outside diameter of the member 23, hence the annular portion 26 thereof, is preferably slightly smaller than the inside diameter of the casing 11 adjacent to the lower rim 13 thereof. Thus, the member 23 can be slidably received into the lower end of the casing 11.

A plurality, here four, of legs 27 (FIGURE 2) are each fabricated from heat resistant metal and are secured, as by welding, to the circular member 23 and/or the lower end of the container side wall 17 so that they extend below the lower and outer edge of said circular member 23 for engagement with, and support within, means, such as the pan-type grill 29. The legs 27 are selected to provide the correct draft clearance between the lower rim 13 of casing 11 and the supporting surface, such as the bottom of said grill 29.

A plurality, such as four, of lower guide arms 28 (FIGURE 2) are secured to, and extend radially outwardly from, the side wall 17 near the lower end thereof at uniform intervals therearound and substantially equidistantly therefrom. In this particular embodiment, the lower guide arms 28 are integral with the upper portions of the legs 27, for convenience in fabrication, and they extend toward the inner surface of the casing 11 for slidable engagement therewith. A plurality, here four, of upper guide arms 31 (FIGURES 2 and 3) are secured, as by welding, to the side wall 17 near the upper end thereof and extend radially therefrom into sliding engagement with the inside surface of the casing 11. The guide arms 28 and 31 may be mounted upon the casing 11 for slidable engagement with the side wall 17.

The casing 11 (FIGURES 1 and 2) has an axially elongated slot 32 near the upper end thereof. A pin 33 slidably extends through said slot 32 and is secured at its inner end to one of the upper guide arms 31, here the guide arm 31a (FIGURE 2). The slot 32 is arranged so that when its upper end is adjacent to the pin 33, the lower edge of the casing 11 is about even with the circular member 23 which thereby blocks the lower end of the chamber 20. When the lower end of the slot 32 is adjacent to the pin 33, as shown in FIGURE 2, the space between the circular member 23 and the lower rim 13 is sufficient to permit the charcoal to move easily therebetween and discharge from the chamber 20.

An appropriate fastening device, such as the toggle clamp 34, is mounted upon the outer surface of the casing 11 in any convenient manner adjacent to the upper end of the slot 32 for engaging the pin 33 and thereby holding the casing 11 in its lowest position with respect to the container 16, as shown in FIGURE 1.

A cap 36 (FIGURES 1 and 2) having a conical top 37 is slidably and removably supported upon the upper end of the container side wall 17 to facilitate the loading of charcoal into the annular chamber 20. The cap 36 may be connected to one end of an elongated, flexible element, such as a metal chain 39, the other end of which is secured to the upper rim 12 of the casing 11.

A grate 38 (FIGURES 1 and 3), which is comprised of a plurality of intersecting elements, is removably supportable upon the upper rim 12 of the casing 11 and serves, among other things, as a guard for the upper open end of the casing.

Operation

The charcoal conditioner 10 may be advantageously loaded with charcoal and kindling well in advance of its intended use. This is easily and quickly accomplished by first latching the toggle clamp 34 upon the pin 33 so that the container 16 is held in a substantially fixed position with respect to the casing 11. With the cap 36 mounted upon the container 16 (FIGURE 2), the annular chamber 20 is loaded with the desired amount of charcoal briquets 18, which are supported upon the annular portion 26 of the member 23. The amount of the charcoal so loaded will depend largely upon the amount of cooking to be accomplished and the size of the pit or grill to be used. However, a full load of briquets in a chamber 20, which is approximately 10 inches high and has an outside diameter of approximately 7 inches, will provide an average pan-type grill with enough charcoal to burn for several hours. The above statements relating to briquets will apply in most respects to other solid forms of charcoal, such as irregularly sized chunks.

After loading the chamber 20 with charcoal, the cap 36 is removed from the container 16, which is then filled with kindling, such as a few strips of paper and a handful of wooden sticks about ½ of an inch in diameter and about 8 or 10 inches long. Although not necessary, the kindling may be treated in advance with an inflammable material which will enhance its igniting. However, it is neither necessary nor desirable to treat the briquets in chamber 20 with an inflammable material. The cap is then replaced upon the container 16 to protect the kindling. If desired, the grate 38 may be placed upon the upper end of the casing 11. The conditioner 10 is now loaded and ready for use at any time.

When use of the conditioner 10 is desired, it may be lifted by the bail 14 and carried easily and effortlessly to the point of its intended use. For the sake of example, it may be asumed that after the charcoal is ignited in the conditioner 10, it will be used in the pan-type grill 29 (FIGURE 1). In such case, the cap 36 may be removed from the container 16 as soon as the location of its intended use is reached. The kindling in the container 16 is then ignited by any convenient means, such as a match or cigarette lighter, which may be either held under the perforated bottom wall 22 or applied to a piece of paper which is dropped into the container 16. The grill 29 can be set up and arranged for reception of the ignited charcoal while the igniting of the charcoal is occurring in the conditioner 10.

The container side wall 17 serves as a stack, through which a strong upward draft is immediately created by the burning kindling. This draft draws ambient air under the lower rim 13 and up through the perforate bottom wall 22 to supply oxygen for combustion, after which the gases of combustion are exhausted through the upper end of the container 16. The draft created through the container 16 is so effective that the zone below the circular member 23 remains relatively cool. Thus, the conditioner can be safely used any place providing a non-inflammable surface is placed directly below the container 16 to catch the ashes which drop from the kindling and/or the inner surfaces of the charcoal.

As the fire from the kindling is swept up through the container 16 by the draft, it quickly and effectively ignites the adjacent inner surfaces of the charcoal. In fact, the briquets are ready for discharge from the conditioner 10 in from ten to fifteen minutes, during which time the original kindling is usually consumed.

If desired, the ignited briquets 18 can remain in the conditioner 10 where they will continue to burn and produce a very substantial amount of heat in the region of the upper end of the casing 11. In such case, the grate 38 may be placed upon the upper end of the casing 11 and the conditioner used to heat a coffee pot or the like, until it is desired to discharge the ignited charcoal into the grill 29.

The transfer of the charcoal from the conditioner 10 into the grill 29 is accomplished by placing the conditioner upright upon its legs 27 within said grill 29. The toggle clamp 34 is then disengaged from the pin 33 and the casing 11 is raised with respect to the container 16 by lifting on the bail 14. Accordingly, the ignited charcoal will slide down the sloped annular flange 26 under the raised lower rim 13 into the grill 29. While still engaging the bail 14, the entire conditioner 10 can now be lifted out of the grill 29 and set to one side. The engagement between the pin 33 and the portion of the casing 11 defining the lower end of the slot 32 will cause the container 16 to be lifted with the casing 11. The ignited charcoal is then distributed in the grill 29 to form a proper bed of burning coals. Within a few minutes, and usually not exceeding 10 or 15 minutes, the ignited charcoal has readjusted itself to its new location and is in proper condition for cooking purposes.

When the conditioner 10 has cooled sufficiently to handle, the toggle clamp 34 is again connected to the pin 33, after which said conditioner 10 can be inverted to remove the kindling ashes. The conditioner is thereupon ready for reloading and another igniting operation.

As a modification of the conditioner 10 (FIGURE 2), the annular portion 26 may be in the form of one or more wire or sheet metal rings spaced from and concentrically secured to the container 16.

Although a particular preferred embodiment of the invention has been described above in detail for illustrative purposes, it will be understood that variations or modifications of such disclosure, which lie within the scope of the invention, are fully contemplated.

What is claimed is:

1. A structure for holding charcoal, while it is being ignited, comprising: a substantially cylindrical casing open at the upper end and lower end thereof; a substantially cylindrical and perforated inner wall disposed within and radially spaced from said casing, said inner wall defining a central chamber and said casing being relatively and axially movable with respect to said inner wall; perforated wall means secured to the lower end of said inner wall and closing the lower end of the central chamber; guide means extending between said inner wall and said casing for holding said inner wall and said casing in spaced, concentric relationship, whereby an annular, concentric chamber is defined between the casing and the inner wall for receiving the charcoal; an annular perforated member secured to and extending radially outwardly from the lower end of said inner wall, said annular member sloping downwardly from said inner wall; means connected between said wall and said casing for limiting said axial movement of said casing with respect to said inner wall between a lowered position wherein said annular member substantially blocks the lower end of said annular chamber and a second position wherein said annular member is spaced downwardly from the lower end of said annular chamber a distance at least equal to the radial thickness of said annular chamber; lock means holding said casing fixed with respect to said inner wall in said lowered position; and legs fixed with respect to, and extending downwardly from, said annular member for supporting said inner wall and said casing spaced from a plane defined by the lower ends of said legs.

2. The structure of claim 1 wherein said means restricting movement of said casing with respect to said inner wall includes a lengthwise slot through said casing and an element secured to said guide means and extending through said slot, said guide means being affixed to said inner wall; and wherein said lock means includes a fastener secured to said casing and releasably engageable with said element for holding said wall in said lowered position with respect to said casing.

3. The structure of claim 2 including a bail on said casing near the upper end thereof; a cap removably mounted upon the upper end of said inner wall and an elongated flexible element securing said cap with respect to said casing.

References Cited in the file of this patent

UNITED STATES PATENTS

| | | |
|---|---|---|
| 1,954,542 | Scheu | Apr. 10, 1934 |

FOREIGN PATENTS

| | | |
|---|---|---|
| 216,024 | Australia | July 11, 1958 |
| 85,828 | Switzerland | July 16, 1920 |
| 508,282 | Germany | Sept. 26, 1930 |